2 Sheets—Sheet 1.

AULTMAN & MILLER.

Mowing Machine.

No. 774.

Reissued July 19, 1859.

N. PETERS, Photo-Lithographer, Washington, D. C.

AULTMAN & MILLER.
Mowing Machine.
No. 774.
Reissued July 19, 1859.
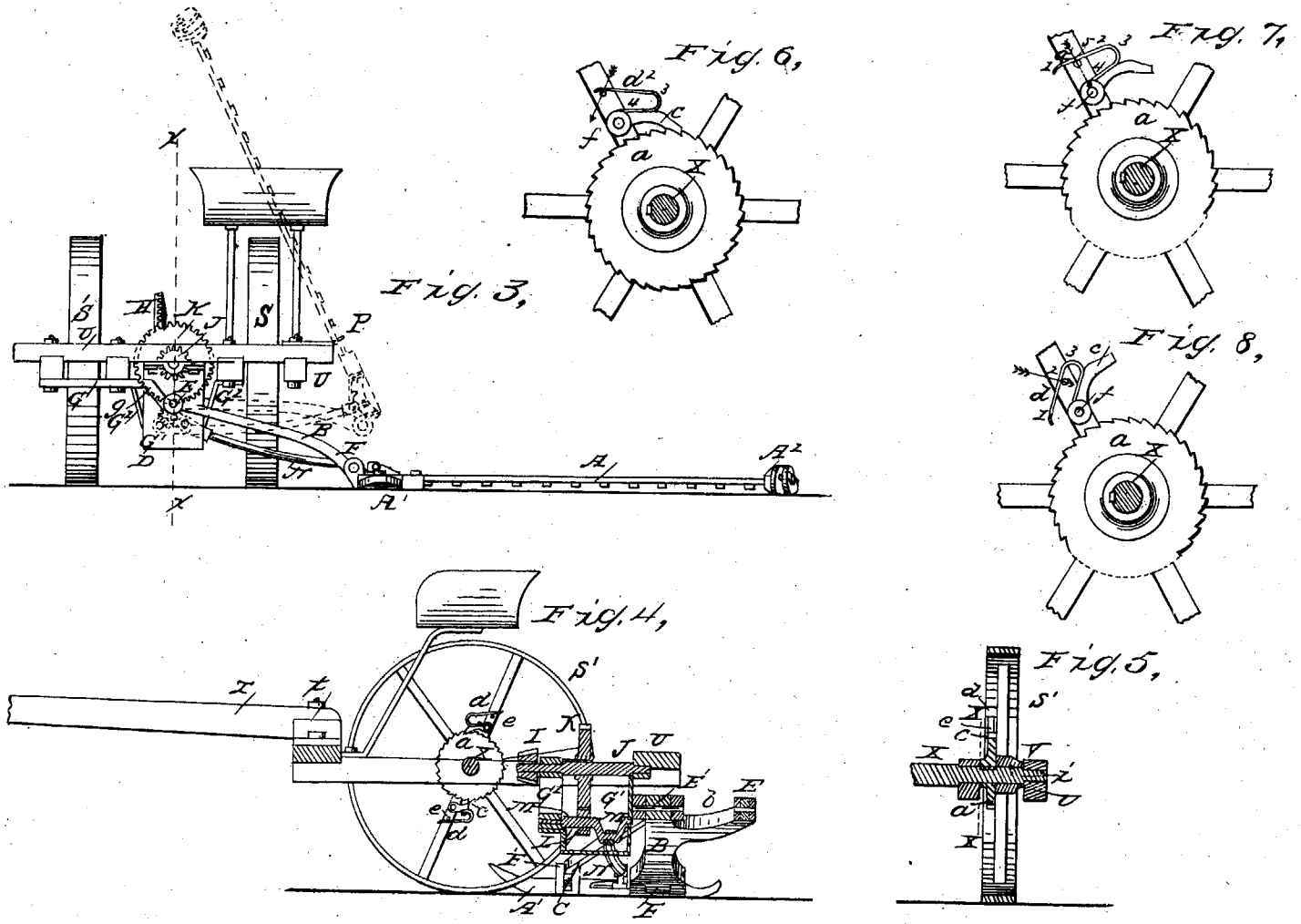
N. PETERS, Photo-Lithographer, Washington, D. C.

UNITED STATES PATENT OFFICE.

C. AULTMAN AND LEWIS MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 774, dated July 19, 1859.

DIVISION E².

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 1:
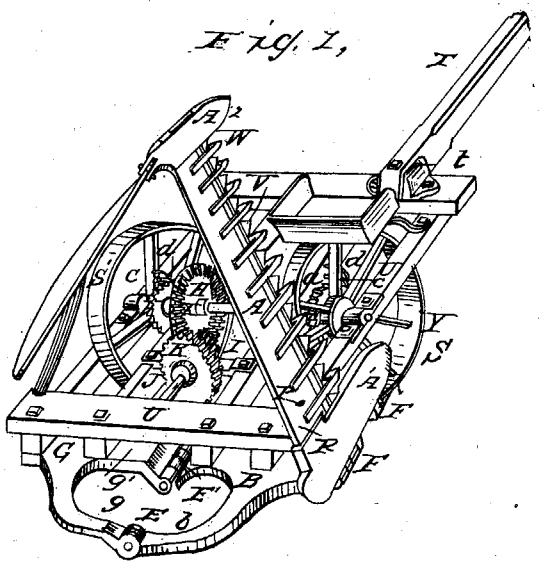
Figure 2:
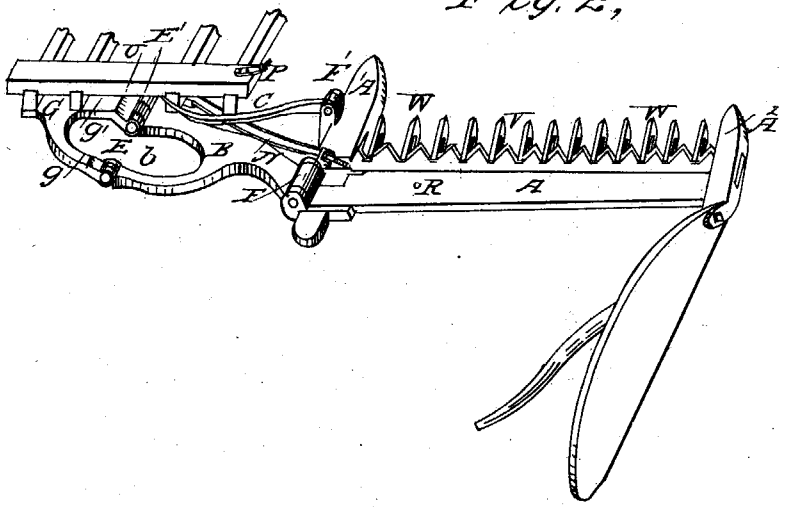

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine with the finger-beam extended upon the ground ready for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through the wheel and axle. Fig. 6 represents a transverse section at the line *x x* of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure. Fig. 8 represents the same view of the parts shown in Fig. 6, but with the spring and pawl in a third position different from those shown in Figs. 6 and 7.

We term that side of the machine the "right" side which would be at the right hand of a person behind the machine and looking toward it, and the opposite side of the machine we term its "left" side.

Mowing-machines as heretofore constructed have been very liable to injury, while being drawn to the place where the work was to begin, from collisions of the finger-beam with stones, stumps, trees, &c., one class of such collisions resulting from carrying the finger-beam too low and the other from its great lateral extension beyond the main frame of the machine. Moreover, when we adapted the finger-beam to being raised and turned on end against the main frame, we found that it was difficult to secure it in that position without at the same time rendering it troublesome to put up and fasten when the work was done and to unfasten and let down again to prepare the machine for beginning work anew.

To avoid these difficulties is the object of that branch of our invention which is the subject of this patent, and which consists in the combination of a coupling-arm and a finger-beam capable of being raised far enough off the ground to pass above the crops and over stones and other obstructions with a device for holding the finger-beam up safely when thus raised, to adapt the machine to being more conveniently and safely transported from place to place.

The accompanying drawings represent a mowing-machine in which the main frame U is supported like a cart by two large wheels, S S′, and has a tongue, T, projecting in front for the horses to draw by. The frame carries suitable gearing for giving motion to the cutter.

The finger-beam A is connected to the main frame by an intermediate coupling-arm, B, hinged at its left end to the main frame, and at its right end to a shoe, A′, to which the left end of the finger-beam is attached.

The hinge by which the shoe is connected to the coupling-arm is in such a position and so constructed as to admit of the right end of the finger-beam being raised and turned to the left until it stands vertically over the shoe and carried even still farther to the left. After being thus raised on end the finger-beam is lifted up, together with the shoe A′ and the coupling-arm, until a hole, R, in the finger-beam is brought opposite a pin, P, projecting from the side of the frame, when the beam is leaned over toward the frame until the pin enters the hole. The finger-beam is then allowed to hang on the pin, and is thereby securely held up to the frame.

What we claim under this patent is—

The combination of a hinged coupling-arm, the finger-beam, and a catch, substantially as described, whereby the finger-beam can be turned, raised, and held up to render the removal of the machine from place to place more convenient and secure.

In testimony whereof we have hereunto subscribed our names.

CORNELIUS AULTMAN.
LEWIS MILLER.

Witnesses:
DANIEL TONNER,
FRED ORTH.